United States Patent
Hasman et al.

[11] Patent Number: 5,880,846
[45] Date of Patent: Mar. 9, 1999

[54] METHOD AND APPARATUS FOR COLOR-CODED OPTICAL PROFILOMETER

[75] Inventors: Erez Hasman, Kiryat Ono; Asher A. Friesem, Rehovot; Nir Davidson, Rishon LeZion, all of Israel

[73] Assignee: Yeda Research and Development Co. Ltd., Rehovot, Israel

[21] Appl. No.: 918,587

[22] Filed: Aug. 19, 1997

[30] Foreign Application Priority Data

Jul. 9, 1997 [IL] Israel ........................................ 121267

[51] Int. Cl.$^6$ .................................................. G01B 11/24
[52] U.S. Cl. ............................................ 356/376; 356/375
[58] Field of Search ..................... 356/373, 375, 356/376

[56] References Cited

U.S. PATENT DOCUMENTS

| | | | |
|---|---|---|---|
| 4,585,349 | 4/1986 | Gross et al. | 356/375 |
| 5,165,063 | 11/1992 | Strater et al. | 356/376 |
| 5,526,338 | 6/1996 | Hasman et al. | |

*Primary Examiner*—F. L. Evans
*Attorney, Agent, or Firm*—Helfgott & Karas, PC.

[57] ABSTRACT

A triangulation optical system and method for determining at least one coordinate of a surface of an object, along at least one coordinate axis which is substantially transverse to the surface. The method includes the steps of providing incident light of a substantially wide wavelength bandwidth propagating along the axis. Passing the light through an axially dispersing optics so that the light of different wavelengths is focussed at different locations relative to the axis. The different locations defining a multi-colored measuring area and a distance between extreme locations along the axis defining a depth of measuring range. Further, off-axis imaging of the measuring area, detecting intensity of the image and determining the coordinate of the intersection of the surface with the measuring area.

23 Claims, 3 Drawing Sheets

METHOD AND APPARATUS FOR COLOR-CODED OPTICAL PROFILOMETER

FIELD OF THE INVENTION

The present invention relates to non-contact optical measurements of surface profiles or displacements, and is particularly useful for three-dimensional sensing which requires high horizontal and vertical resolution of measurements over a wide range thereof.

BACKGROUND OF THE INVENTION

Non-contact electro-optical measuring systems are advantageous over those using mechanical sensing, because of their relatively high speed and non-destructive capabilities. The increasing need for non-contact surface displacement and profile measurements has already led to the development of such electro-optical systems as those incorporating interferometry methods, speckle detection, Moire deflectometry, stereo vision, focus error detection, time of flight, confocal microscopy and structured light triangulation.

Confocal microscopy and structured light triangulation are widely known methods for measuring surface profiles or displacements. Scanning confocal microscopes can measure surface profiles with high accuracy and in on-axis configuration which minimizes shadowing problems. However, the measurements are performed serially (point by point) and are therefore usually very slow.

The structured light triangulation methods are the most wide-spread. They are suitable for industrial applications, in that they offer a simple and robust 3-D measurement. Structured light triangulation systems determine distance to an object by projecting thereon light from a source and imaging the projected pattern on to a detector. With the position of the image on the detector, the lateral separation between the detector lens and the light source, and the projection angle of the source being known, the distance to the object is determined. Sequential measurements at different coordinates on the object lead to a full 3-D image of the object's surface profile.

The simplest structured light system projects a single point of light from the light source on to an object. The point is then imaged on a detector which is in the form of lateral effect photodiodes or a linear array. The imaging is performed point by point until the surface is scanned completely. The 3-D measurement according to this procedure can be inexpensive and has high resolution. The single point triangulation system, however, involves lengthy time-consuming scanning, which is often impractical.

A second class of triangulation systems operates by projecting a light stripe on to an object and using a two-dimensional detector array. Fewer frames are needed to scan over an object, and scanning need only be done in the direction perpendicular to the stripe.

However, the above light triangulation systems cannot simultaneously achieve a large depth measuring range and high lateral resolution. The reason for this is that usually, in optical elements, a long focal depth cannot be combined with a small spot size since the latter requires high numerical apertures, whereas the former requires low numerical apertures. Mathematically, the combination of Abbe's formula for lateral resolution $$\left(\frac{1}{\delta x}\right),$$

where $\delta x$ is the spot size, and Rayleigh's formula for the depth of focus $\delta F$ yields:

$$\delta F = \frac{\kappa (\delta x)^2}{\lambda_0} \qquad (1)$$

where $\lambda_0$ is the wavelength of the light and $\kappa$ is a constant number between 1 and 4 which depends on the exact definitions of $\delta x$ and $\delta F$.

A common trade-off approach is to use a relatively large spot, the center of which can be determined with much higher accuracy than the spot-size, by complicated numerical techniques. Such an approach suffers from the drawback that it is highly sensitive to local changes in the reflectivity or the shape of the object. Thus, for example, short radii of curvature cannot be adequately dealt with using this approach.

SUMMARY OF THE INVENTION

It is therefore an object of the invention to provide a method and system for non-contact surface profile and displacement measurements in which the drawbacks of hitherto proposed approaches are significantly reduced or eliminated.

According to one aspect of the present invention, there is provided a triangulation method for determining at least one coordinate of a surface of an object, along at least one coordinate axis which is substantially transverse to said surface, comprising the steps of:

(a) providing incident light of a substantially wide wavelength bandwidth propagating along said axis;

(b) passing said light through an axially dispersing optics so that the light of different wavelengths is focused at different locations relative to said axis, said different locations defining a multi-colored measuring area and a distance between extreme locations along said axis defining a depth measuring range; and (c) off-axis imaging of said measuring area;

(d) detecting intensity of the image; and (e) determining thereby the coordinate of the intersection of the surface with said measuring area.

In accordance with a second aspect of the present invention, there is provided a triangulation optical system for determining at least one coordinate of a surface of an object, along at least one coordinate axis which is substantially transverse to said surface, said system comprising:

a source of light having a substantially wide wavelength bandwidth;

an axially dispersing optics having a focal length different for different wavelengths for focusing the incident light of different wavelengths at different locations relative to said axis, said different locations defining a multi-colored measuring area and a distance between extreme locations along said axis defining a depth measuring range;

an off-axis imaging optics for imaging the measuring area;

a detecting device for detecting intensity of the image; and image processing means of determining the coordinate of the intersection of the surface with said measuring area.

The method and the system of the present invention are preferably used for 3-dimensional surface topography and are based either on point-by-point measurements or on stripe scanning. In the first case, the axially dispersing optics is a spherical focusing lens which focuses the incident light of different wavelengths to different points on said axis. In the second case, the axially dispersing optics is a cylindrical focusing lens which forms light stripes of different colors (wavelengths) at different distances therefrom along said axis, so that a "rainbow" light sheet is obtained. In both cases, the system may be provided with a collimating optics disposed between the light source and the axially dispersing optics, for forming a collimated beam of light, which is further focussed by the axially dispersing optics into the points or stripes corresponding to the different wavelengths of the incident light.

The axially dispersing optics may be in the form of an on-axis diffractive optical element (DOE) or rather in the form of a diffractive-refractive optical element, by virtue of which the depth of measuring range may be changed while keeping the same effective focal length of the axially dispersing optics. It should be mentioned here that the axially dispersing optics used in the preferred embodiments of the present invention, is known per se. Thus, for example the use of such optics in reading multi-layer optical disks is disclosed in U.S. Pat. No. 5,526,338.

The off-imaging optics is based on the triangulation concept, where the imaging takes place at an angle to the axis along which the object is illuminated.

The present invention allows fast, real time surface mapping, with high depth measuring range and high horizontal resolution. The invention may be employed as an efficient tool in factory automation, inspection of the production of mechanical parts and electronic devices, and many other applications requiring three dimensional measurements.

BRIEF DESCRIPTION OF THE DRAWINGS

In order to understand the invention and to see how it may be carried out in practice, a preferred embodiment will now be described, by way of non-limiting example only, with reference to the accompanying drawings in which.

DETAILED DESCRIPTION OF PREFERRED EMBODIMENTS

Figure 1:
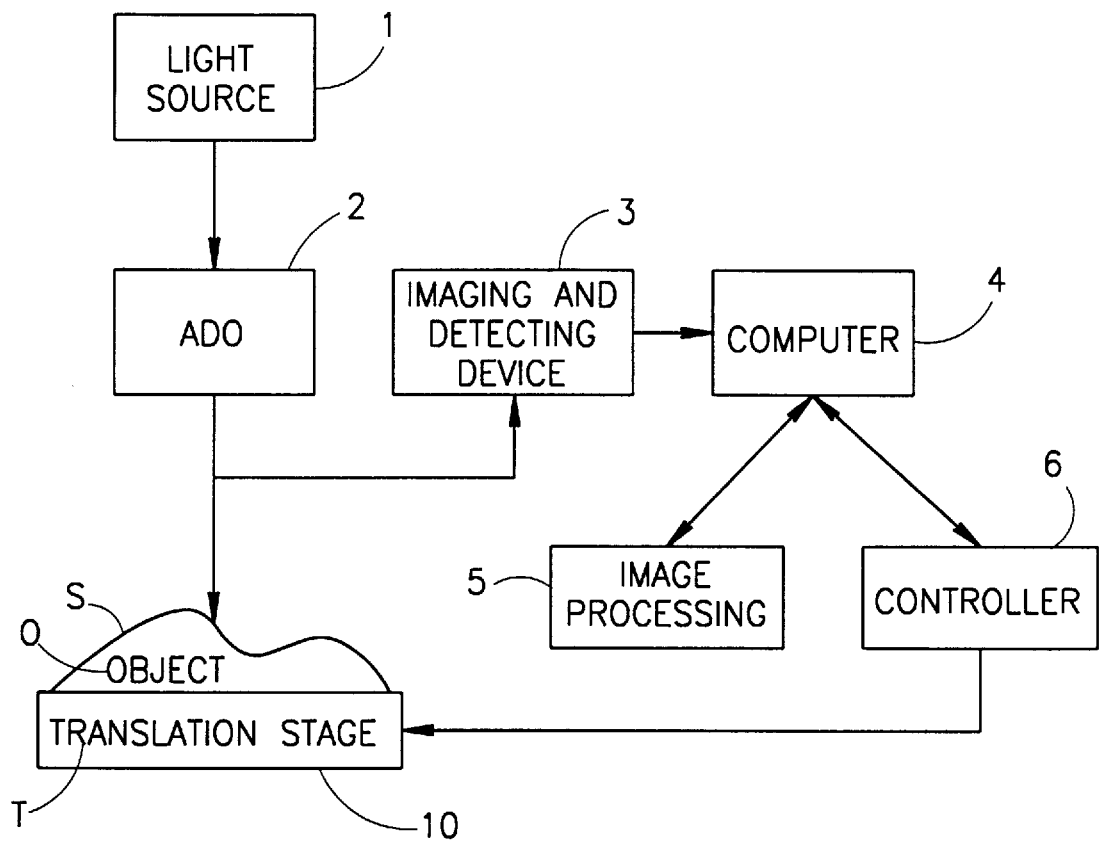
FIG. 1 is a block diagram of a color-coded optical profilometer according to a general concept of the present invention.

FIG. 1 is a block diagram of a color-coded optical profilometer (CCOP) of the present invention, used for the 3-dimensional topography of a surface S of an object O carried by a translation stage T.

The CCOP shown in FIG. 1 generally comprises an illumination optics including a light source 1 and an axially dispersing optics (ADO) 2 through which the light from the source 1 is focussed on the surface S, an imaging and detecting system 3 for imaging and detecting the focussed light, a computer 4 associated with an image processing device 5 for the analysis of the image and determining thereby coordinates of the surface S along the axis of light propagation, and with a controller 6 for displacing the translation stage T with the object O in the plane perpendicular to the axis of light propagation so that a complete 3-D profile thereof may be obtained.

The light source 1 of the illumination optics is a white light source of a relatively large wavelength bandwidth, preferably of high brightness. For example, such light source as a monochromator illuminator of Oriel company, 75 watts Xenon, source image of dimension 0.5 mm*1 mm (model No. 6251) may be used. Alternatively, the light source may be a very short pulsed laser (several femtosecond pulse duration). An example of such a source is Ti:sapphire pulsed laser, from either Coherent Co. or Spectra Physics Co. The light source may be associated with a collimating optics (not shown in FIG. 1) for the illumination of the axially dispersing optics with a collimated light.

The axially dispersing optics 2 of the illumination optics of the CCOP shown in FIG. 1 may have any suitable design providing that a focal length thereof depends on the wavelength of the incident light. The axially dispersing optics 2 may be a spherical or cylindrical lens. In the first case, the lens focuses the incident light of different wavelengths to different points along the optical axis of the illumination optics. In the second case, the lens forms light stripes of different colors at different distances therefrom so that a "rainbow" light sheet is obtained. Preferably, the axially dispersing optics is in the form of a cylindrical on-axis diffractive optical element or in the form of a cylindrical refractive-diffractive element.

Figure 2:
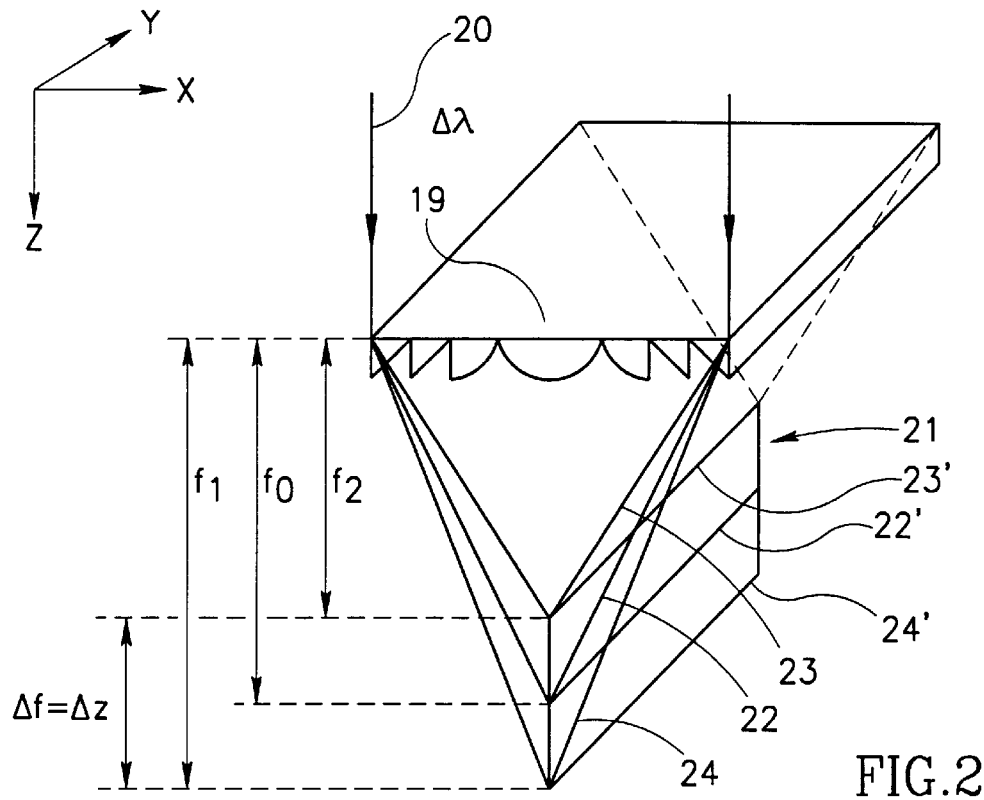
FIG. 2 shows schematically one example of an axially dispersing optics for use in the profilometer shown in FIG. 1.

FIG. 2 illustrates an example of a cylindrical on axis diffractive element 19 for use in the CCOP according to the present invention. For such an element, the dependence of the focal length on the incident light wavelength, $f(\lambda)$, may be expressed mathematically as follows. For an idealized diffractive optical element formed as a thin lens and having a one-dimensional quadratic phase ($\phi$) function, the transmission function $t(x)$ is given by:

$$t(x) = \exp(i\phi) = \exp\left[\frac{-i\pi(x^2)}{\lambda_0 f_0}\right] \quad (2)$$

where x is the coordinate in the plane of the thin lens, $\lambda_0$ is the wavelength of the light, and $f_0$ is the focal length of the lens. However, when such a diffractive optical element is illuminated using another wavelength, $\lambda$, there is obtained the well known result that the focal length $f(\lambda)$ is given by:

$$f(\lambda) = \left(\frac{\lambda_0}{\lambda}\right) f_0 \quad (3)$$

Equation (3) indicates that the focal length $f(\lambda)$ is inversely proportional to the wavelength $\lambda$, which defines the axial dispersion of the diffractive optical element.

FIG. 2 shows the result of the illumination of the diffractive optical element 19 with the quadratic phase function, designed to focus a beam 22 of a wavelength $\lambda_0$ ($\lambda_2 > \lambda_0 > \lambda_1$) at the focal length of $f_0$, with a collimated light beam 20 of a wavelength band $\Delta\lambda$, where $\Delta\lambda = \lambda_2 - \lambda_1$ ($\lambda_2$ and $\lambda_1$ are the upper and lower boundary wavelengths of the light band). As seen, beams 23 and 24 of the respective wavelengths $\lambda_2$ and $\lambda_1$ are focussed at respective distances $f_2$ and $f_1$ from the element 19, $f_2$ being defined as $f_2 = f_0 \lambda_0 / \lambda_2$; and $f_1$ being defined as $f_1=f_0\lambda_0/\lambda_{-1}$. Thereby, a "rainbow" light sheet 21 is formed (in the plane ZY), comprising light stripes 22', 23' and 24' of different wavelengths disposed at different distances from the element 19. The extension of the "rainbow" light sheet along the optical axis Z of the element 19, Δz, which in fact is the measuring range Δf of the CCOP, may be defined by the relation $$\Delta f = \Delta z = f_0 \left( \frac{\Delta\lambda}{\lambda_0} \right) \quad (4)$$

For example, substituting in Eq. (4) Δλ=300 nm, λ$_0$=600 nm and f$_0$=180 mm, the result is Δf=90 mm.

In order to change the measuring range Δf, while keeping the same effective focal length, it is necessary to combine diffractive and refractive elements. Thus, if the broadband light illuminates a refractive lens with a focal length $f_r(\lambda)$ and a diffractive optical element with a focal length $f_d(\lambda)$ in cascade, then assuming negligible separation between the refractive and diffractive elements, the following simple lens combination equation may be obtained:

$$\frac{1}{F(\lambda)} = \frac{1}{f_d(\lambda)} + \frac{1}{f_r(\lambda)} \quad (5)$$

where $F(\lambda)$ is the desired focal distance of the combined lens. Using Eq. (3) and neglecting the dispersion of the refractive lens $f_r(\lambda)=f_r$, the more general relation to Eq. (5) is obtained as follows:

$$\Delta F = \left( \frac{F_0}{f_0} \right) \left[ F_0 \left( \frac{\Delta\lambda}{\lambda_0} \right) \right] \quad (6)$$

where $F_0 = F(\lambda=\lambda_0)$, and $f_0=f_d(\lambda=\lambda_2)$. For example, if ΔF=Δz=19.4 mm and with Δλ/λ$_0$=0.5 and F$_0$=197 mm, then Eqs. (5) and (6) yield f$_0$=1000 mm and f$_r$=245 mm.

Figure 3:
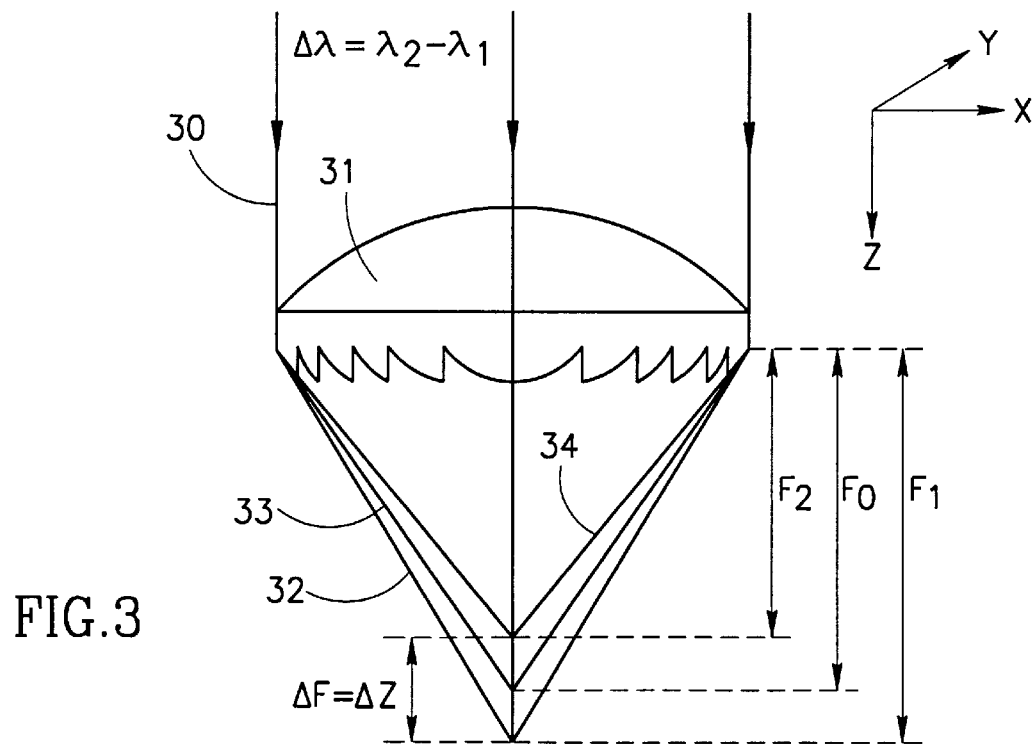
FIG. 3 shows schematically another example of the axially dispersing optics for use in the profilometer shown in FIG. 1.

The combination of diffractive and reflective elements may be either in the form of a hybrid (integral) element, as shown in FIG. 3, or rather it may be comprised of separate reflective and diffractive elements. The former is particularly advantageous because of its relative simplicity in that the diffractive element can be recorded directly on the planar surface of a plano-convex refractive lens, using conventional photolithographic techniques, or resorting to diamond turning.

As shown in FIG. 3, a hybrid lens 31 axially disperses the light beam 30 in the manner similar to that of the diffractive optical element 20 in FIG. 2. The hybrid lens 31 includes a plano-convex cylindrical lens bearing a diffractive element with blazed grooves (kinoform) on the planar surface thereof. The hybrid lens 31 focuses an incident light 30 into light stripes of different wavelengths at different distances therefrom. For example, a beam 32 of a wavelength λ$_1$ is focused at a focal length of F$_1$, a beam 33 of a wavelength λ$_0$ is focused at a focal length F$_0$, and a beam 34 of a wavelength λ$_2$ is focused at a focal length F$_2$.

The diffractive optical elements shown in FIGS. 2 and 3 may generally have one or two-dimensional phase functions of quadratic or spherical type. They may be formed by exploiting a computer-generated mask, lithography, etching and thin film deposition. It is also possible to utilize diamond turning technology for realizing such an element. The diffractive optical elements may also be formed by holographic recording.

Reverting now to FIG. 1, the imaging and detecting system 3 of the CCOP generally comprises an imaging lens which images the light focussed on the object O by the axially dispersing element 2, and a detector, e.g. such as a CCD, for the detection of the image.

The imaging and detecting system 3 is of an off-axis type, i.e. the CCOP is based on the triangulation, concept with the imaging being performed at an angle to the optical axis along which the object is illuminated as described below with reference to FIG. 4.

Figure 4:
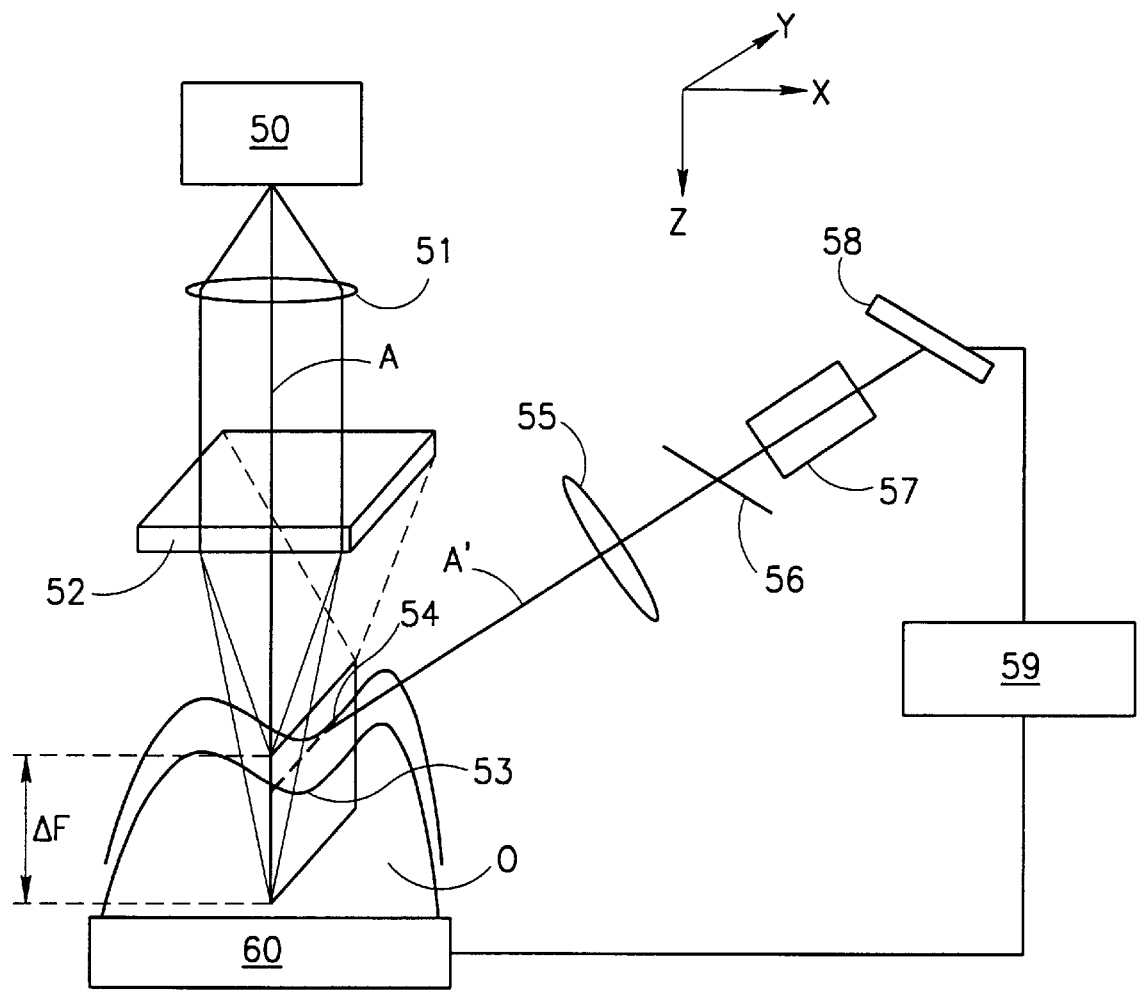
FIG. 4 shows schematically a color-coded optical profilometer according on one embodiment of the present invention.

Fig. 4 illustrates a color-coded stripe triangulation profilometer in accordance with the present invention. An illumination branch of the system has an optical axis A co-directional with the axis Z of the coordinate system XYZ, and comprises a broadband light source 50, preferably in the form of a white light source such as a Xenon arc lamp having a wavelength range of 400 to 700 nm, a collimating optics 51 and a cylindrical axially dispersing optics 52 which is either a diffractive optical element as shown in FIG. 2 or a diffractive-refractive optical element, e.g. as shown in FIG. 3.

The collimating optics 51 forms a collimated beam of the light emitted by the light source 50, and the axially dispersing optics 52 focuses the collimated beam to form a "rainbow" light sheet 53 which consists of light stripes of different wavelengths at different distances from the axially dispersing optics 52.

An object O with a maximum height difference smaller than the focal depth ΔF of the axially dispersing optics, is placed in the region of the "rainbow" light sheet 53 and intersects the latter at a multi-colored line 54 defining the object's profile z(y), the line 54 being typically curved and, consequently, having different coordinates along the axis Z. In order to obtain a complete 3-D profile z(x,y) of the object, the measurements are repeated at different locations of the object 0, by shifting a translation stage 60 with the object O. The shifting of the translation stage 60 is controlled by a computer 59.

Figure 5:
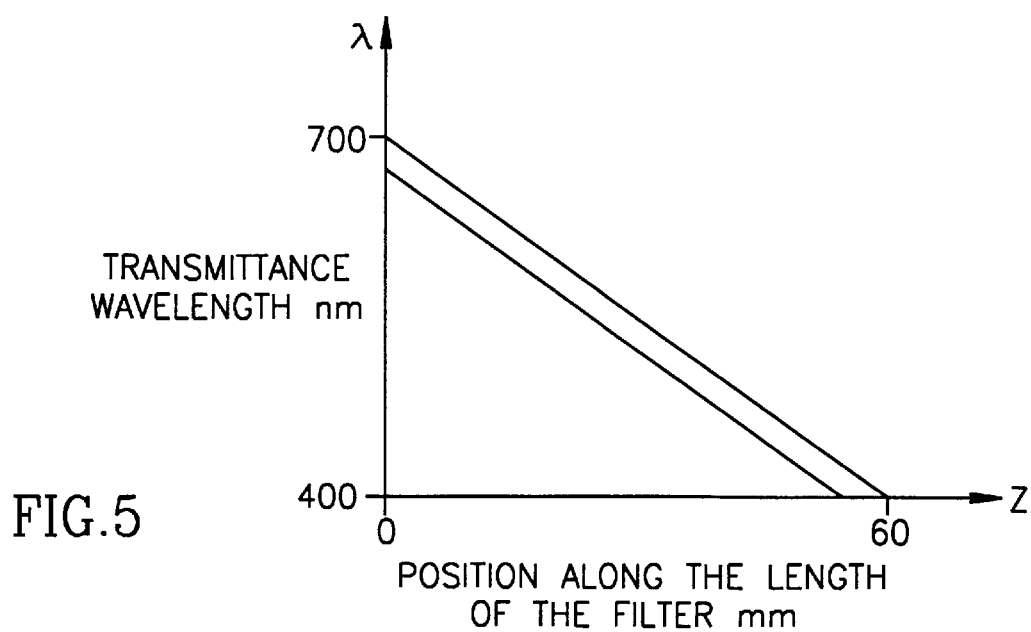
FIG. 5 shows graphically the operation of a variable wavelength filter for use in the profilometer shown in FIG. 4.

The multi-colored line 54 comprises, at each location thereof, a single main color surrounded by background colors. The line 54 is imaged by an imaging lens 55 along an optical axis A' which defines with the optical axis A an angle θ (about π/4 rad), to a CCD 58 by using lens or zoom lens 57. For obtaining a 'sharp' image of the multi-colored line 54, the imaging is performed through a variable wavelength filter 56 in which the light wavelength that is transmitted therethrough varies depending on the location along the length of the filter. FIG. 5 illustrates graphically the transmittance wavelength of a linear variable interference filter, as a function of the position along the length thereof. The vertical distance between the two curves represent the spectral width of the filter at each position. The number of wavelengths that can be discriminated, M$_f$, is the total spectral range divided by the spectral width of the filter.

It is desirable that the location of the light of the transmitted wavelength along the length of the variable wavelength filter, corresponds to the dispersion of the light provided by the axially dispersing optics 52. Thus, if the axially dispersing element 52 provides for a linear dispersion, which may be obtained by the combination of diffractive-refractive lenses, a linear variable interference filter should be used. Thus, for example, a linear variable interference filter part No. VERIL S 60 having a spectral range of 400 to 700 nm and a spectral width of 15 nm, will provide M$_f$=20. Such a filter can be used with a diffractive element of focal length f$_0$ =1000 mm and cylindrical refractive lens with a focal length f$_r$=245 mm, yielding a focal depth of about ΔF=19.4 mm (Eq. 6), where the dispersion which is obtained is approximately linear at wavelengths ranging from 400 to 700 nm.

Variable wavelength filters of the above kind offer continuous spectral discrimination within the desired wavelength region. They may be fabricated with dielectric coatings which are vacuum deposited on to the substrates. In order to simplify the optical system, it is possible to insert a variable filter having an appropriate dimension, directly in front of the CCD.

It should be noted specifically that, in order to ensure that the image of the profile of the surface formed on the CCD is sharp independently of the z-coordinate thereof along the axis A, the variable filter 56 and the CCD 58 must be tilted against the axis A of the illumination branch of the system at respective angles $\gamma_{fil}$ and $\gamma_{CCD}$ (not shown). Appropriate values of the tilt angles of the variable filter 56 and the CCD 58 may be obtained by applying to the geometry the Scheimpflug condition, according to which two tilted planes can be imaged onto each other if their tilt angles θ and γ and the on-axis magnification β correspond $$\tan(\gamma) = 1/\beta \tan(\theta) \quad (7)$$

In order to obtain an optimal design of the profilometer, it is necessary to find the optimal parameters of its optical elements. To characterize the performance of a triangulation system, a commonly used merit function, i.e. its (one dimensional) SBP (space bandwidth product), is employed, being defined as:

$$SBP = \frac{\delta F}{(\delta x)_{image}} \quad (8)$$

where δF is the conventional depth of focus, defined by Eq. (1), and $(\delta x)_{image}$ is the spot-size which is imaged at tilt angle θ, which is defined as $$(\delta x)_{image} = \frac{\delta x}{\cos(\theta)} \quad (9)$$

With the profilometer of the present invention, it is possible to multiply the depth of focus relative to that of the conventional triangulation system by $M_f$ of the variable wavelength filter, (for example: $M_f=20$ for filter VERIL S 60), while still maintaining a nearly diffraction limited spot-size. The resulting extended depth of focus is given by:

$$\Delta F = M_f \delta F \quad (10)$$

and the new SBP (defined by $SBP_{new}$) is given by $$SBP_{new} = \frac{\Delta F}{(\delta x)_{image}} = M_f SBP \quad (11)$$

Substituting Eqs. (1), (9) and (10) into Eq. (11) yields $$SBP_{new} = \frac{\delta x M_f \cos(\theta) \kappa}{\lambda_0} \quad (12)$$

As an illustrative example, we assume a desired spot-size (horizontal resolution) δx=25 micron, θ=π/4, $\lambda_0$=0.6 micron, κ=1, $M_f$=20, yielding a conventional depth of focus of δF=1 mm, and an extended depth of focus of ΔF=20 mm. The SBP of a conventional triangulation system with such characteristic is only SBP=30, whereas the SBP of the color-coded stripe triangulation profilometer according to the present invention is $SBP_{new}$=600. Note that this SBP is compatible with the number of pixels (in the column) of available CCDs, so that the full increase in SBP may be ready utilized.

When the requirement of the signal-to-noise ratio is not extremely high, the multi-colored line 54 may be imaged directly, i.e. without the use of the variable wavelength filter. In this case, in order to improve the signal-to-noise ratio of the detected image, there may be used a color CCD or three black/white CCDs with red, green and blue appropriate hardware+software filtering systems to obtain an appropriate weighting function for each of red, green and blue signals.

The system of the present invention may be used for the control of both transparent and non-transparent objects and may perform measurements by means of reflected and transmitted light.

While the invention has been described with respect to a limited number of embodiments, it will be appreciated that many variations, modifications and other applications of the invention may be made.

We claim:

1. A triangulation method for determining at least one coordinate of a surface of an object, along at least one coordinate axis which is substantially transverse to said surface, comprising the steps of:
   (a) providing incident light of a substantially wide wavelength bandwidth propagating alone said axis;
   (b) passing said incident light through an axially dispersing optics so that the light of different wavelengths is focused at different locations relative to said axis, said different locations defining a multi-colored measuring area and a distance between extreme locations along said axis defining a depth measuring range;
   (c) off-axis imaging of said measuring area;
   (d) detecting intensity of the image; and
   (e) determining thereby the coordinate of the intersection of the surface with said measuring area.

2. A method according to claim 1, used for the 3-dimensional surface topography.

3. A method according to claim 1, wherein the incident light of different wavelengths is focused at different light stripes lying in different focal planes, said measuring area is in the form of a 2-dimensional light sheet passing through said axis perpendicularly to said focal planes, and the step (e) is performed with respect to the intersection line between the surface of the object and said light sheet, whereby coordinates of a profile of the surface are determined.

4. A method according to claim 3, wherein the object is scanned by a stripe of light and the steps (b) to (e) are performed stripe-by-stripe.

5. A method according to claim 4, wherein the light of different wavelengths is focussed at different points located on said axis said measuring area is in the form of a light line on said axis, and the step (e) is performed with respect to the point of the intersection of the surface of the object with said light line.

6. A method according to claim 1, wherein the object is scanned by a point of light and the steps (b) to (e) are performed at different locations of the surface of the object, point-by-point.

7. A method according to claim 1, wherein step (c) is performed through a variable wavelength filter in which the wavelength of the light transmitted thereby varies depending on the location along the length of the filter, the location of the light of the wavelength transmitted by the filter corresponding to the dispersion of the light provided by the axially dispersing optics, whereby a sharp image of the intersection of the surface of the object with the measuring area is obtained.

8. A triangulation optical system for determining at least one coordinate of a surface of an object, along a coordinate axis which is substantially transverse to said surface, said system comprising:
   a source of light having a substantial wide wavelength bandwidth and providing the light propagation along said axis;

axially dispersing optics having a focal length different for different wave-lengths, for focusing the incident light of different wavelengths at different locations relative to said axis, said different locations defining a multi-colored measuring area and a distance between extreme locations along said axis defining a depth measuring range;

off-axis imaging optics having an imaging axis at angle to said coordinate axis for imaging the measuring area;

a detecting device for detecting intensity of the image; and image processing means of determining the coordinate of the intersection of the surface with said measuring area.

9. An optical system according to claim 8, wherein said axially dispersing optics focuses the incident light at different points located on said axis, said measuring area is in the form of a light line on said axis, and said image processing means determine the coordinate of the point of the intersection of the surface of the object said light line.

10. An optical system according to claim 9, wherein said axially dispersing optics is a spherical focusing lens.

11. An optical system according to claim 8, wherein said axially dispersing optics focuses the incident light at different light stripes lying in different focal planes, said measuring area is in the form of a 2-dimensional light sheet passing through said axis perpendicularly to said focal planes, and said image processing means determine the coordinates of the line of the intersection between the surface of the object and said light sheet, whereby a profile of the surface is determined.

12. An optical system according to claim 11, wherein said axially dispersing optics is a cylindrical focusing lens.

13. An optical system according to claim 8, wherein said light source is a white light source.

14. An optical system according to claim 8, wherein said light source is a very short pulsed laser which produces relatively wide wave-length bandwidth.

15. An optical system according to claim 8, wherein the imaging optics includes a variable wavelength filter in which the wavelength of the light transmitted thereby varies depending on the location along the length of the filter.

16. An optical system according to claim 15, wherein the location of the light of the wavelength transmitted by the filter corresponds to the dispersion of the light provided by the axially dispersing optics.

17. An optical system according to claim 8, wherein said detecting device is a detecting camera.

18. An optical system according to claim 17, wherein said camera is a black-white camera.

19. An optical system according to claim 17, wherein said camera is based on three black/white cameras with color filters.

20. An optical system according to claim 17, wherein said camera is a color camera.

21. An optical system according to claim 19, wherein the camera is associated with a programmed color filter based on including an appropriate weighting function for each of red, green and blue CCD signals.

22. An optical system according to any one of claims 17 to 20, wherein said camera is of a CCD type.

23. An optical system according to claim 8, used for the 3-dimensional surface topography.

* * * * *